July 14, 1925.
A. LE BLANC
1,546,090
BELT STRETCHER
Original Filed Jan. 15, 1924    2 Sheets-Sheet 1
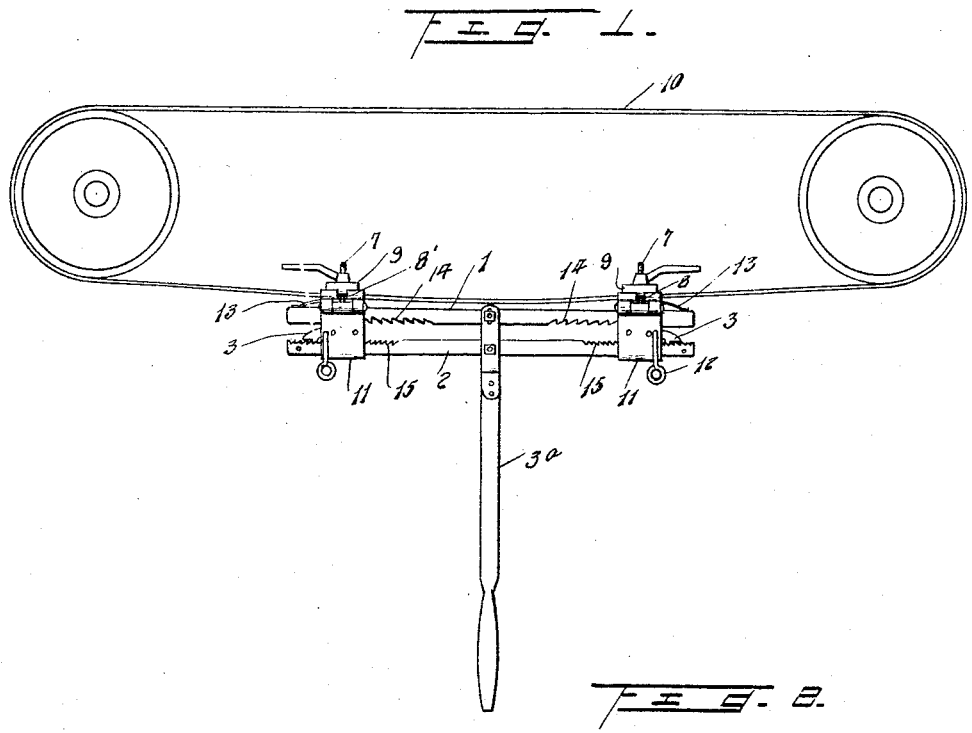
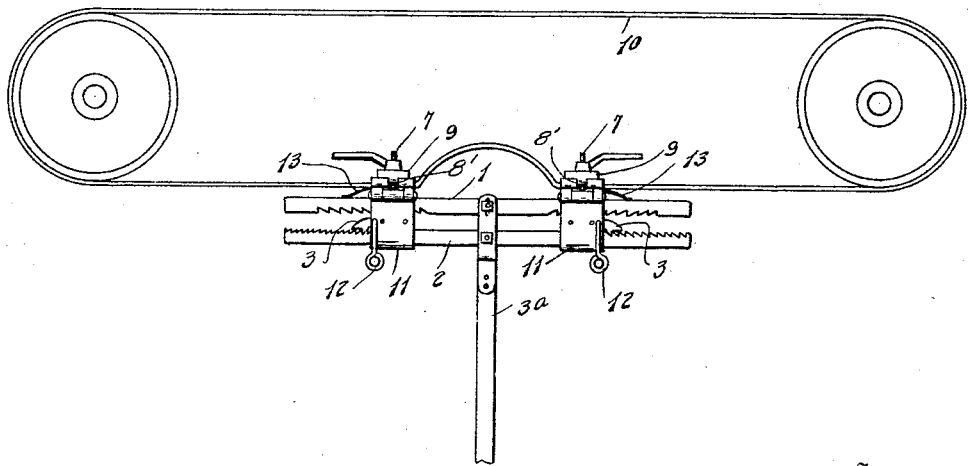
Inventor
A. Le Blanc.
By [signature]
Attorney

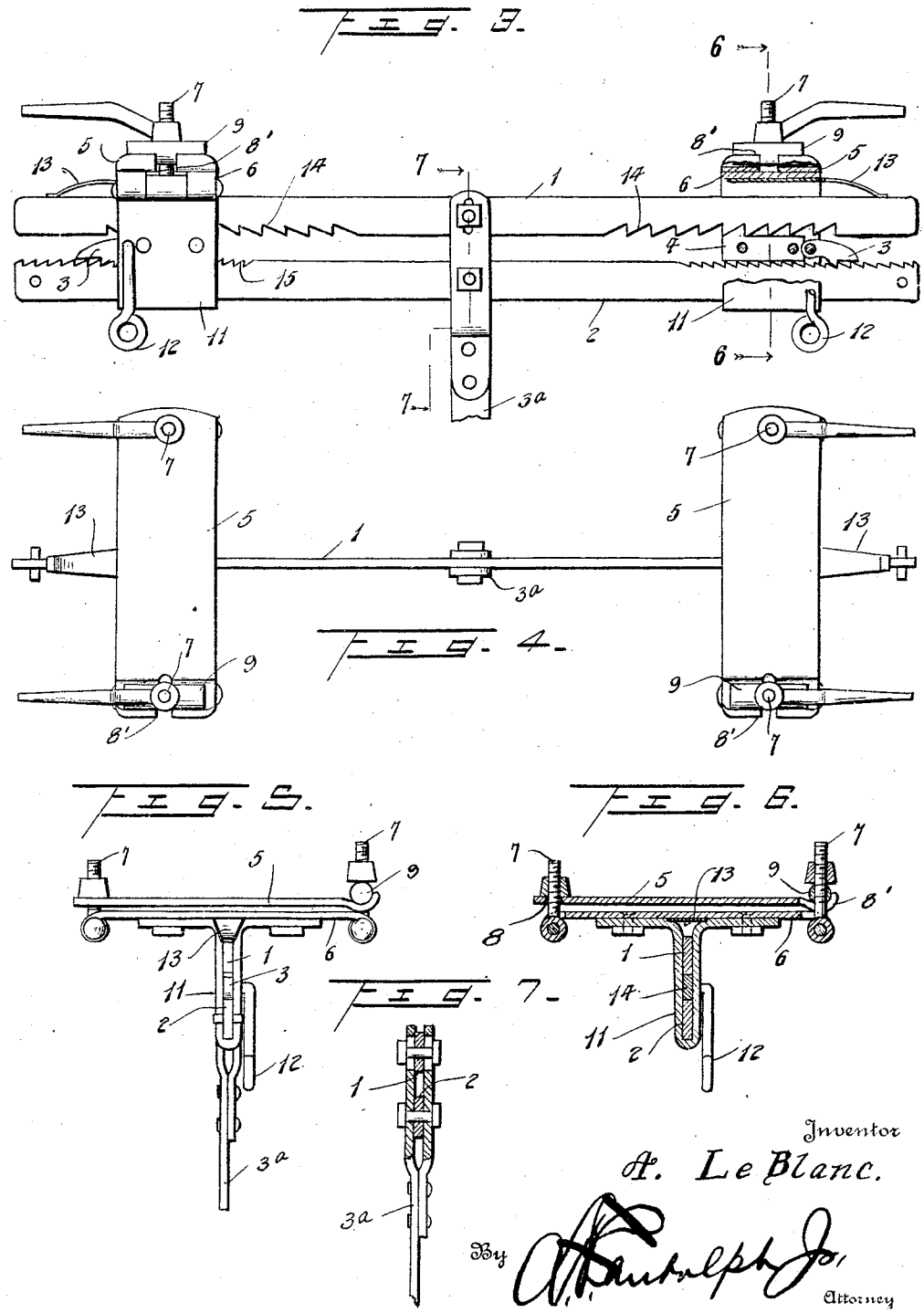

Patented July 14, 1925.

1,546,090

UNITED STATES PATENT OFFICE.

ALBERT LE BLANC, OF SAN ANTONIO, TEXAS.

BELT STRETCHER.

Application filed January 15, 1924, Serial No. 686,351. Renewed April 14, 1925.

*To all whom it may concern:*

Be it known that I, ALBERT LE BLANC, a citizen of the United States, residing at San Antonio, in the county of Bexar and State of Texas, have invented certain new and useful Improvements in Belt Stretchers; and I do hereby declare the following to be a full, clear, and exact description of the invention, such as will enable others skilled in the art to which it appertains to make and use the same.

The present invention has relation to a tightening tool and more particularly to a stretcher for taking up slack in a drive belt and holding the same while removing a portion of the belt and fastening the intercepted ends.

The invention has for its object the provision of a tool embodying a pair of belt clamps, cooperating ratchet bars, an operating lever having pivotal connection with the ratchet bars whereby to impart an alternate intermittent movement thereto, and pawls carried by the belt clamps and adapted to coact with the ratchet bars, whereby to intermittently advance the belt clamps and hold them in the adjusted position.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Figure 1 is a side view showing the application of the invention,

Figure 2 is a view similar to Figure 1 after the tool has been operated to take up the slack in the belt, Figure 3 is an enlarged side view of the tool, parts being broken away, Figure 4 is a top plan view of the tool, Figure 5 is an end view of the tool, Figure 6 is a sectional view on the line 6—6 of Figure 3, and Figure 7 is a sectional view on the line 7—7 of Figure 3.

Corresponding and like parts are referred to in the following description and designated in the several views of the drawings by like reference characters.

The tool comprises similar belt clamps, spaced ratchet bars 1 and 2, an operating lever 3 having pivotal connection with the ratchet bars, and a pair of pawls 3 and 4 carried by each of the belt clamps and adapted to cooperate with the respective ratchet bars 2 and 1.

Each of the belt clamps comprises plates 5 and 6 and clamp bolts 7 which are pivotally connected to opposite ends of the plate 6. One of the clamp bolts 7 passes through an opening 8 in an end of the plate 5 and the other clamp bolt seats in an open slot 8′ formed in the opposite end of the plate 5 and receives a crossbar 9 which extends across the slot 8′ to enable the two plates to be drawn together so as to clamp a belt 10 therebetween. A keeper 11 is secured to the plate 6 and receives the ratchet bars 1 and 2 and the pawls 3 and 4, the latter being disposed between the ratchet bars and secured to the keeper, the pawl 4 being fixed, whereas the pawl 3 is pivoted and is adapted to be operated by a handpiece 12. The ratchet bar 2 is mounted to receive a rectilinear movement only, whereas the ratchet bar 1 receives both a rectilinear movement and a movement towards and away from the ratchet bar 2, whereby to clear the teeth of the pawl 4. A flat spring 13 is attached at one end to each of the belt clamps and its free end engages the ratchet bar 1 to normally urge it towards the ratchet bar 2, whereby to hold its teeth 14 in engagement with the teeth of the fixed pawl 4. The teeth 15 of the ratchet bar 2 coact with the teeth of the pawl 3. The ratchet teeth 14 and 15 face in opposite directions and in the operation of the tool, the operating lever 3ª is oscillated, thereby imparting an alternate intermittent movement to the ratchet bars 1 and 2 with the result that the belt clamps are drawn together and take up slack in the drive belt 10 to which the said clamps are attached, as indicated most clearly in Figure. 2. After the belt has been tightened, a portion comprised between the belt clamps is removed to eliminate the slack after the intercepted ends have been fastened in any preferred way.

What is claimed is:

1. A belt tightener comprising a pair of belt clamps, a pair of ratchet bars, an operating lever having pivotal connection with each of the ratchet bars to impart an alternate intermittent longitudinal movement thereto, and a pair of pawls for each belt clamp disposed to cooperate with the ratchet bars.

2. A belt tightener comprising a pair of belt clamps, a pair of ratchet bars having the belt clamps mounted thereon, one of the ratchet bars having a rectilinear movement only and the other ratchet bar having both a rectilinear movement and a movement towards and away from the companion ratchet, an operating lever having pivotal connection with each of the ratchet bars, and a pair of pawls carried by each of the belt clamps, one of the pawls being fixed and the other pawl pivoted.

3. A belt tightener comprising belt clamps each including companion plates, clamp bolts pivoted to opposite ends of one of the plates, one of the clamp bolts passing through an opening in the end of the companion plate and the other clamp bolt seating in an open slot in the opposite end of the companion plate, a keeper projecting from one of the plates, a pair of ratchet bars slidably mounted in the keepers of the belt clamps, one of ratchet bars having a rectilinear movement only and the other ratchet bar having both a rectilinear movement and a movement towards and away from the companion ratchet bar, an operating lever having pivotal connection with each of the ratchet bars, and a pair of pawls mounted in each of the keepers, one of the pawls being fixed and the other pawl pivoted.

In testimony whereof I affix my signature in presence of two witnesses.

ALBERT LE BLANC.

Witnesses:
 FORREST CAMPBELL,
 LESTER MURRY.